Jan. 24, 1928.
W. J. FRANCKE
1,657,353
TEMPERATURE INDICATOR
Filed Feb. 1, 1922   2 Sheets-Sheet 1
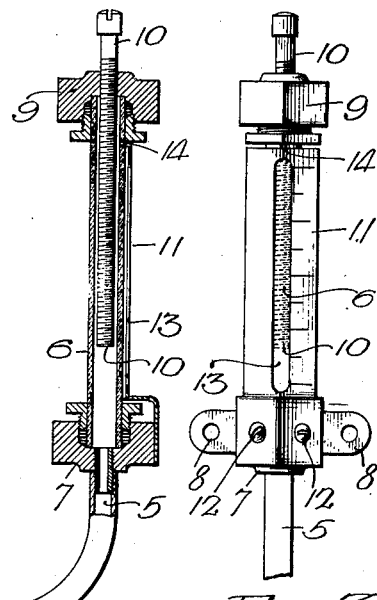
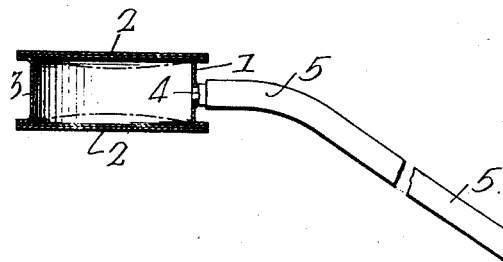
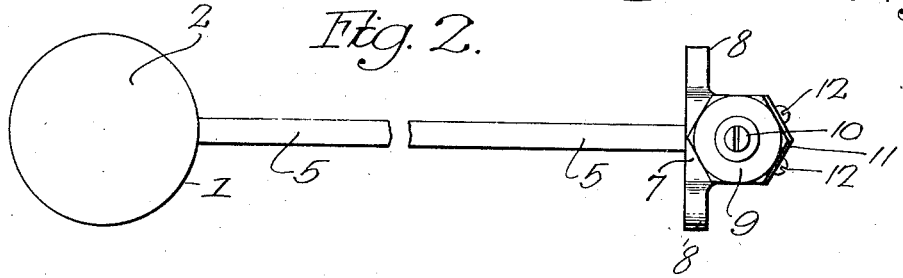
Inventor.—
William J. Francke.
by his Attorneys—
Howson & Howson Jan. 24, 1928.
W. J. FRANCKE
1,657,353
TEMPERATURE INDICATOR
Filed Feb. 1, 1922
2 Sheets-Sheet 2
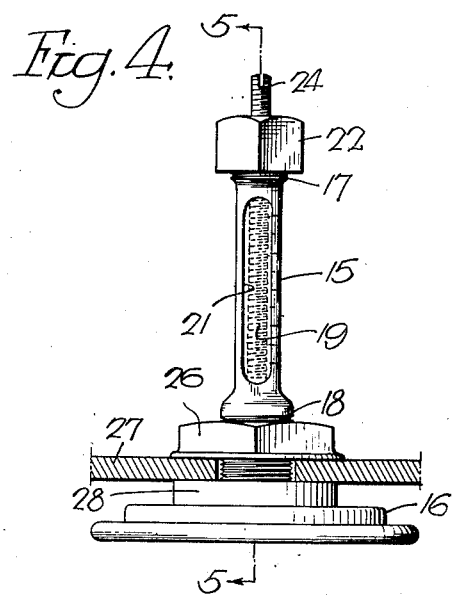
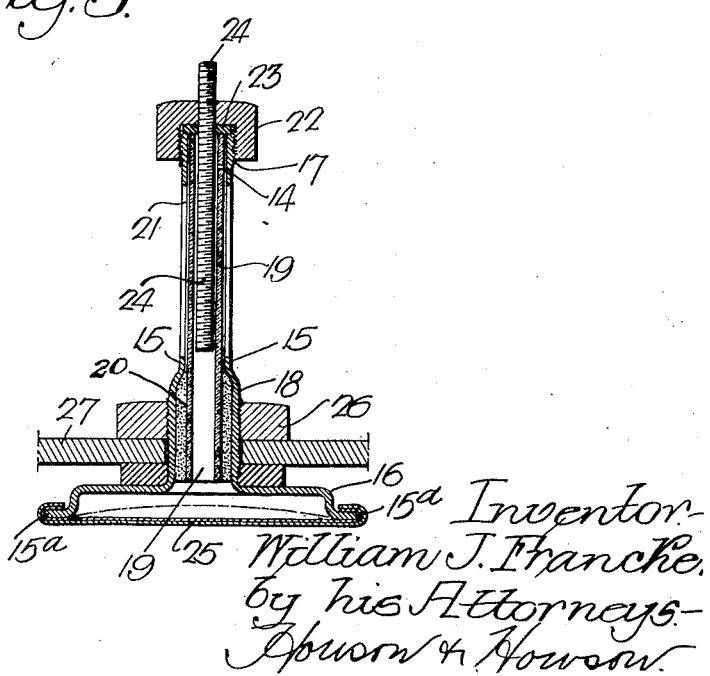
Inventor.
William J. Francke,
by his Attorneys
Howson & Howson.

Patented Jan. 24, 1928.

1,657,353

UNITED STATES PATENT OFFICE.

WILLIAM J. FRANCKE, OF NEW BRUNSWICK, NEW JERSEY.

TEMPERATURE INDICATOR.

Application filed February 1, 1922. Serial No. 533,212.

One object of this invention is to provide a temperature indicator in which the indicating elements may be located at a distance from the heat responsive element, thereby permitting the positioning of the former elements at points of vantage.

The invention further resides in a novel and improved construction and operation affording many advantages hitherto unobtainable in temperature indicators.

In the attached drawings:

Figure 1, is a partial section of an indicator made in accordance with my invention;

Fig. 2, is a plan view of the device;

Fig. 3, is a front elevation of the indicating member;

Fig. 4, is a view of a modification within the scope of the invention, and

Fig. 5, is a section on the line 5—5, Fig. 4.

The device consists essentially of a hollow shell or container, with which is associated a thermosensitive element adapted to move under the effect of a changing temperature, and in moving to alter the content of the container; together with means for indicating the displacement of a contained liquid under the action of the thermosensitive element. In the present instance, a transparent tube communicates with the interior of the container into which the liquid extends, which tube has associated therewith a suitably graduated element by means of which changes in the level of the liquid in the tube may be measured and the said displacement thereby indicated.

With reference to Figures 1, 2 and 3 of the drawings, I have, in the present instance, shown the container in the form of a hollow cylindrical drum 1, the flat sides 2, 2, of which are bimetallic plates, each being composed of a pair of metal disks having materially different co-efficients of expansion secured together. The plates 2 may be secured to the cylindrical ring 3 which constitutes the remainder of the drum by soldering or in any other suitable manner, and are so arranged that under the influence of a rising temperature, the plates have a tendency to bow inwardly, as indicated in broken lines in Fig. 1, such bowing having the effect, as will be apparent, of decreasing the content of the drum.

In the ring 3 of the drum is an opening 4, with which communicates a duct 5, said duct preferably being flexible and attaching at its outer end to a tube 6 of glass. As clearly illustrated, this tube is provided with a base fixture 7, to which the tube 5 is attached, and in which the tube 6 is firmly secured, said fixture 7 having in the present instance apertured wings 8, 8, providing means for attaching the tube 6 to any body desired. The tube 6 is also provided with a top fixture 9, in the top of which is a threaded aperture through which extends a set screw 10 into the interior of the tube 6, the diameter of said set screw being slightly smaller than the interior diameter of the tube. There is also provided a suitably graduated element or plate 11 which, in the present instance, is angular in form and is secured by means of screws 12, 12, to the angular front of the fixture 7, said plate 11 having a longitudinal opening 13 which exposes the tube 6. A vent hole 14 preferably is provided at a suitable point near the top of the tube 6 whereby the interior of the tube is in communication with the atmosphere.

In operation, the device is partially filled with a suitable liquid through the top of the tube 6 by removal of the fixture 9, there being sufficient liquid to fill the drum and the duct 5 and to mount into the tube. The drum 1 is then placed in the space or attached to the body the temperature of which it is desired to register, and the level of the liquid in the tube 6 adjusted by means of the set screw 10 to a level indicating on the plate 11 the then temperature at the position of the drum 1, which temperature may be determined by an independent thermometer. The set screw 10 and the adjustment thereby provided for is essential, particularly where the duct 5 is flexible, since it will be apparent that different positions of the duct will create a difference in the level of the liquid in the tube 6.

It will now be apparent that any change in temperature at the drum 1 will be indicated by a change in the level of the liquid in the tube 6, such change being due to the alteration in the content of the drum 1 created by the movement of the plates 2, 2.

The screw 10 in addition to providing means for regulating the level of the liquid also functions to restrict the interior area of the tube 6, whereby a comparatively small movement of the plates 2 of the drum effects a considerable change in the position of the liquid in the tube.

It has been found desirable to coat or paint the screw 10 with a luminous radium compound, since in this manner the level of the opaque liquid in the tube 6 is made visible in the dark. The lower portion of the screw being immersed and hidden, the lower edge of the luminous area will indicate the level of the liquid.

Considerable modification of the device is possible with no departure from the essential features of the invention, such, for example, as illustrated in Figs. 4 and 5. In this modification, the extended connector is eliminated and the transparent tube, which in the present instance constitutes the means for ascertaining the displacement caused by movement of the thermosensitive element, is secured in the container itself. The device consists of a metal tube 15 of three diameters, one end 16 being spread out to a diameter considerably larger than the other end 17, and there being an intermediate section 18 of a diameter slightly larger than the end 17. A glass tube 19 is secured in the smaller sections of the tube by means of suitable cement 20 at the intermediate section 18, which cement also acts as a seal between the outside of the tube 19 and the inside of the section. The section 17 of the tube 15 is apertured at 21, both front and rear, to expose the glass tube, and the top of this section 17 is threaded for the reception of a cap nut 22 which with a washer 23 closes the top of the tube 19. The usual adjusting screw 24 extends into the tube 19 through the nut 22. A bimetallic plate 25 is secured across and closes the enlarged end 16 of the tube 15, said plate being turned over the out-turned edge 15ª of the tube 15, and being pressed or soldered to form a tight joint. As indicated in broken lines in Fig. 5, the plate 25 is adapted under a rising temperature to curve inwardly, thereby reducing the content of the chamber which it forms with the expanded end 16 of the tube 15.

The intermediate section 18 of the tube 15 is externally threaded, in the present instance, for the reception of a nut 26, the device in this manner being adapted for instalment in a cover or other plate or element 27. A soft washer 28 may be provided between the plate 27 and the top of the enlarged end 16. The usual vent 14 is provided at the top of the glass tube, and the tube 15 marked at the edges of the apertures 21 to provide an indicating means for the temperature.

It is preferred in this modification that the screw 24 be coated with a luminous substance, as previously described, and one side of the glass tube 19 may also be coated to assist in rendering the device readable in the dark.

The operation of the device is in all respects similar to that previously described. A suitable liquid is poured into the device through the top of the glass tube, the liquid being adjusted to a proper level by the adjusting screw 24. Changes in temperature affect the position of the plate 25, and thus alter the content of the chamber at the lower end of the device, and in so doing alter the level of the liquid in the tube 19.

I claim:

1. A temperature indicator comprising a container, a heat responsive element associated with the container and adapted with varying temperatures to change the content of the latter, a hollow element communicating with the interior of the container, a liquid in said container extending into the hollow element, and means for determining the level of the liquid in said latter element.

2. A temperature indicator comprising a hollow drum, a side of which is composed of a bimetallic plate, a tube communicating with the interior of said drum, a liquid in said drum mounting into said tube, and means for determining the level of the liquid in said tube.

3. A temperature indicator comprising a container, a bimetallic element associated with said container and adapted in different positions to change the content of the latter, a tube communicating with the interior of the said container, a liquid in said container and tube, means for adjusting the level of the liquid in the tube, and means for determining the level of the liquid in the tube.

4. A temperature indicator comprising a container, a thermostatic element movable under the effects of a changing temperature and adapted with varying temperatures to change the content of the container, a tube communicating with the container, a liquid in said container and partially filling said tube, and an element extending into the tube and adapted to decrease the cross sectional area of the latter, said element being adjustable in and out of said tube, and means for determining the level of the liquid in the tube.

5. A temperature indicator comprising a container, a bimetallic element movable under the effects of a changing temperature and adapted with varying temperatures to change the content of the container in different positions, a transparent tube communicating with the container, a liquid in said container and partially filling said tube, and an element having a luminous coating extending into the tube and adapted to decrease the cross sectional area of the latter.

6. A temperature indicator comprising a container, a thermosensitive element movable under the effects of a changing temperature and adapted in different positions to change the content of the container, a transparent tube communicating with the container, a liquid filling said container and partially filling said tube, an element extending into the tube adapted to decrease the cross sectional area of the latter, said element being adjustable in and out of said tube, and a graduated plate associated with the tube to indicate the level of the liquid therein.

7. A temperature indicator comprising a container, a bimetallic element associated with the container and adapted to distort under the effect of a changing temperature and in distortion to change the content of the container, a fluid in the container, and means for indicating the amount of the displacement of said fluid under movement of the bimetallic element.

8. A temperature indicator comprising a container, a bimetallic element associated with the container and adapted to move under the effect of a changing temperature and in moving to change the content of the container, and means for measuring the changes in said content.

9. A temperature indicator comprising a container having a bimetallic side plate adapted to distort at predetermined temperatures to an extent varying with the temperature and thereby to vary the cubical content of the container, and means operatively associated with the container for indicating the said variations.

10. A temperature indicator comprising a container having a bimetallic side plate adapted to distort at predetermined temperatures to an extent varying with the temperature and thereby to vary the cubical content of the container, and means operatively associated with the container for indicating the said variations and calibrated to afford an indication of the temperature.

WILLIAM J. FRANCKE.